United States Patent
Chang

[19]

[11] Patent Number: 5,912,667
[45] Date of Patent: Jun. 15, 1999

[54] CURSOR CONTROL SYSTEM FOR CONTROLLING A POP-UP MENU

[75] Inventor: Ming-Chih Chang, Taipei, Taiwan

[73] Assignee: Primax Electronics Ltd., Taipei Hsien, Taiwan

[21] Appl. No.: 08/926,736

[22] Filed: Sep. 10, 1997

[51] Int. Cl.[6] .................................................... G06R 3/00
[52] U.S. Cl. .......................................... 345/347; 345/146
[58] Field of Search .................................... 345/145, 146, 345/160, 161, 167, 169, 352, 353, 347

[56] References Cited

U.S. PATENT DOCUMENTS

| | | | |
|---|---|---|---|
| 4,713,656 | 12/1987 | Cliff et al. | 345/146 |
| 4,772,882 | 9/1988 | Mical | 345/146 |
| 4,870,389 | 9/1989 | Ishiwata et al. | 463/38 |
| 5,374,942 | 12/1994 | Gilligan et al. | 345/157 |
| 5,446,480 | 8/1995 | Yoshida | 345/157 |
| 5,565,889 | 10/1996 | Crooks et al. | 345/157 |
| 5,572,237 | 11/1996 | Crooks et al. | 345/156 |
| 5,646,821 | 7/1997 | Sun | 361/683 |
| 5,801,953 | 9/1998 | Thoma et al. | 364/487 |

*Primary Examiner*—A. Katbab
*Attorney, Agent, or Firm*—Winston Hsu

[57] ABSTRACT

The present invention provides a cursor control system for controlling operations of a pop-up menu. The menu comprises a plurality of command regions, each of which has a correspondent computer command. The system comprises a displaying device for displaying the pop-up menu, a computer electrically connected to the displaying device and a cursor control device electrically connected to the computer. The computer comprises a program for controlling image display of the displaying device and operations of the menu. The cursor control device comprises a housing having a recess installed in it, a cursor controller elastically installed in the recess for generating a shifting signal, and a switch installed in the recess beneath the cursor controller for generating a start signal. When a user presses the cursor controller and thus triggers the switch, the program will receive the start signal generated by the switch and then will display the menu over the displaying device. When the program hereafter receives shifting signals generated by the cursor controller, the program will select one command region on the menu according to the shifting signals. And when the user releases the cursor controller and the switch, the program will start executing the computer command of the selected command region.

6 Claims, 2 Drawing Sheets

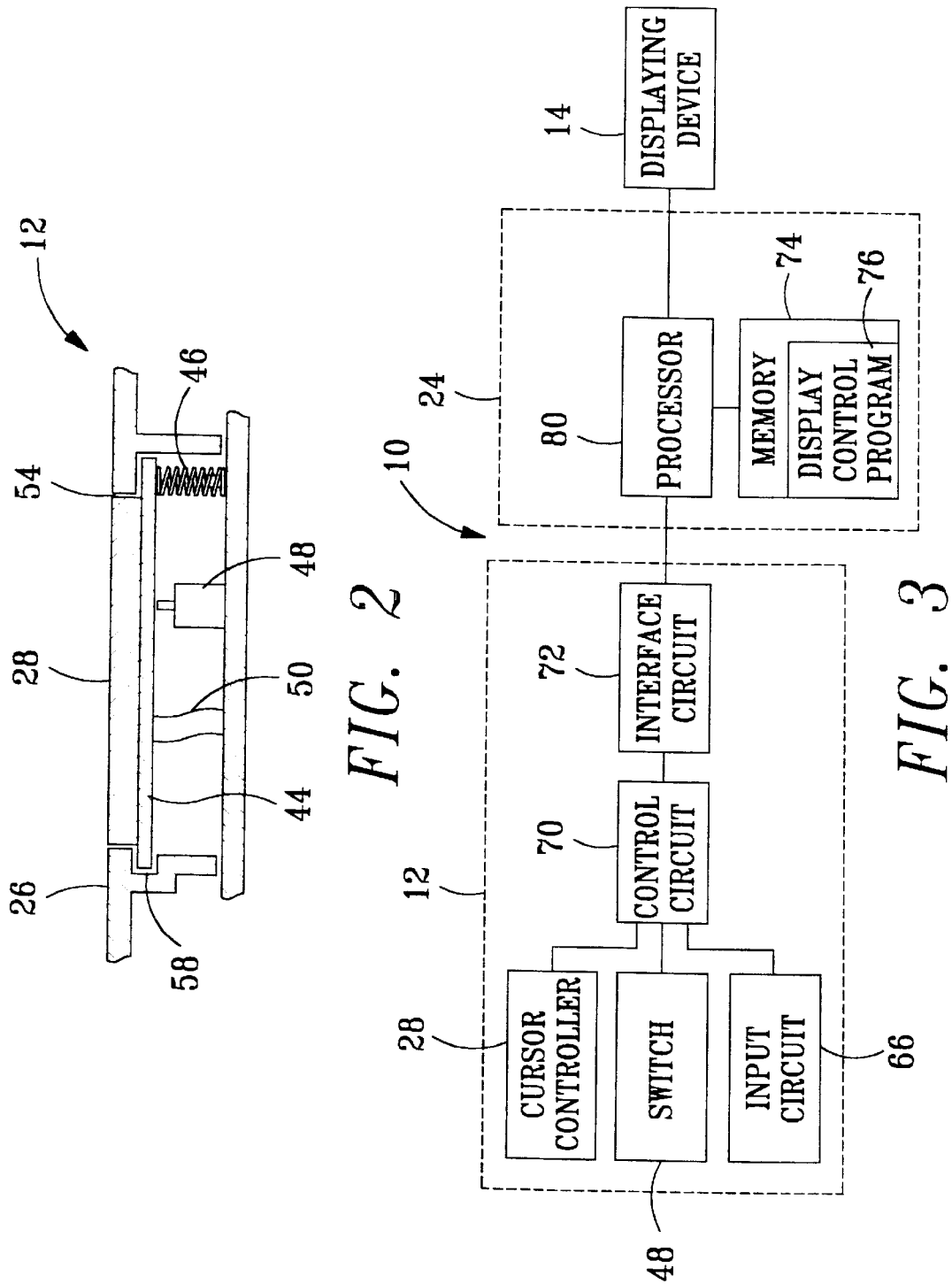

CURSOR CONTROL SYSTEM FOR CONTROLLING A POP-UP MENU

BACKGROUND OF THE INVENTION

1. Field of the Invention

The present invention relates to a cursor control system, and more particularly, to a cursor control system for controlling a pop-up menu.

2. Description of the Prior Art

Pop-up menus are very popular in many window interfaces for executing various groups of computer commands. Normally, a pop-up menu comprises several command regions and each of which contains a frequently used computer command. As the window interfaces get more and more complicated, a user often has difficulty knowing where to locate a frequently used computer command. By putting frequently used computer commands in a pop-up menu can solve such problem. When the user presses a predetermined start key on the cursor control device, such as the right key of the mouse, the computer will immediately display the pop-up menu over the computer screen and the user can then select and execute one of the commands contained in the pop-up menu.

When the pop-up menu is displayed over the computer screen, the user needs to use one finger to press the start key all the time, and also use another finger to operate the touch pad or track ball device to select one computer command shown on the pop-up menu. After the computer command is selected, the user will release the start key and the computer will start executing the selected computer command. Such operation method requires two fingers to control the pop-up menu and is very uncomfortable for a user, especially when the two fingers operate at wrong angles or when the distance between the fingers is too large.

SUMMARY OF THE INVENTION

It is therefore a primary objective of the present invention to provide a cursor control system using single finger to operate a pop-up menu for solving the above mentioned problem.

Briefly, in a preferred embodiment, the present invention includes a cursor control system for controlling operations of a pop-up menu, the menu comprising a plurality of command regions each correspondent to a computer command, the system comprising a displaying device for displaying the pop-up menu, a computer electrically connected to the displaying device and a cursor control device electrically connected to the computer, the computer comprising a program for controlling image display of the displaying device and operations of the menu, the cursor control device comprising:

(1) a housing having a recess installed on it;
(2) a cursor controller installed in the recess for generating shifting signals; and
(3) a switch installed in the recess beneath the cursor controller for generating start signals;

wherein when the cursor controller is being pressed to trigger the switch to generate the start signals, the program displays the menu over the displaying device after receiving the start signals, the program selects one command region of the menu according to the shifting signals later on generated by actuating the cursor controller, and the program executes the command correspondent to the selected command region when the switch under the cursor controller is released and stops generating the start signal.

It is an advantage of the present invention that only one finger is needed to operate the cursor control system to control the pop-up menu.

This and other objectives of the present invention will no doubt become obvious to those of ordinary skill in the art after having read the following detailed description of the preferred embodiment which is illustrated in the various figures and drawings.

BRIEF DESCRIPTION OF THE DRAWINGS

FIG.2 is a side section view 2—2 of the cursor control system shown in FIG. 1.

FIG.3 is a function block diagram of the cursor control system shown in FIG. 1.

DETAILED DESCRIPTION OF THE PREFERRED EMBODIMENT

Figure 1:
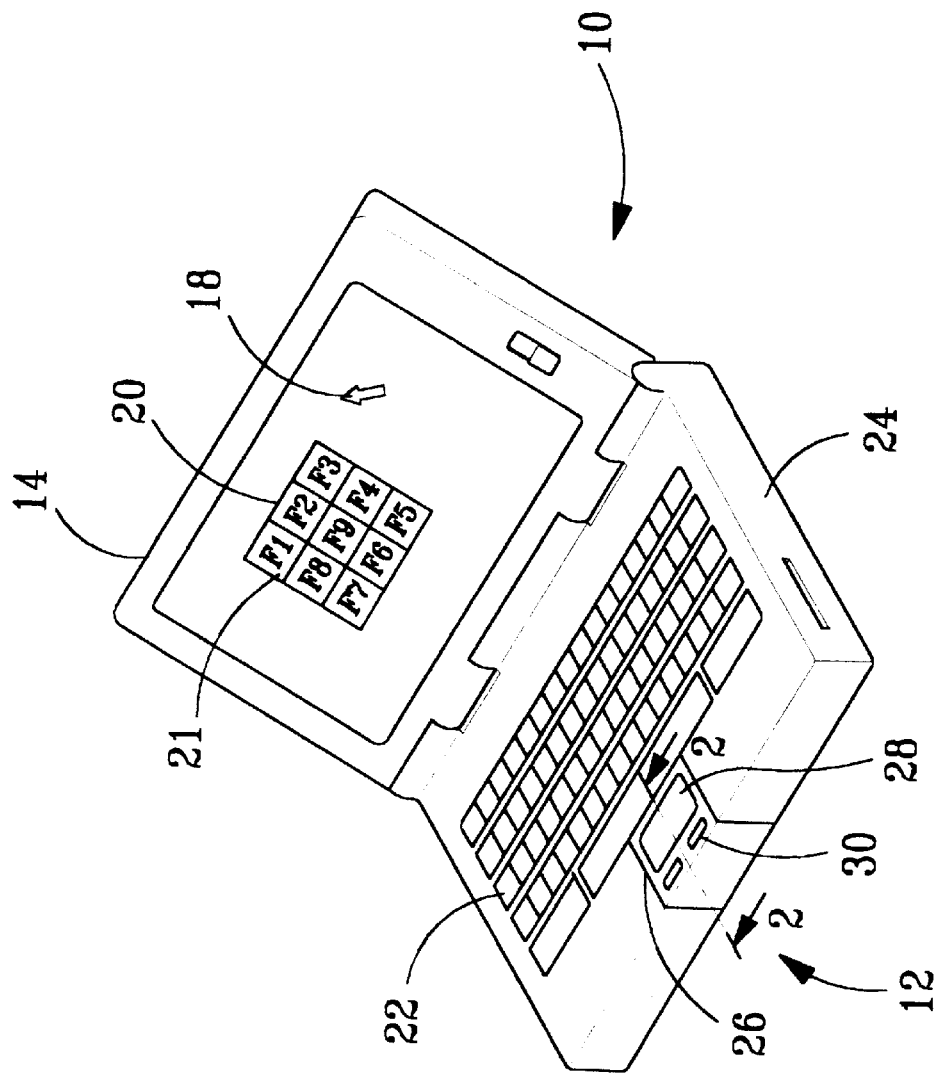
FIG. 1 is a perspective view of a cursor control system according to the present invention.

Please refer to FIG. 1. FIG. 1 is a perspective view of a cursor control system 10 according to the present invention. System 10 comprises a displaying device 14 for displaying a cursor 18 and a pop-up menu 20, a computer 24 electrically connected to the displaying device 14, and a cursor control device 12 electrically connected to the computer 24. The pop-up menu 20 comprises nine command regions 21, each of which contains a correspondent computer command. The computer 24 has a keyboard 22 installed on it and the cursor control device 12 is installed on a front upper end of the keyboard 22. The cursor control device 12 comprises a housing 26, a cursor controller 28 which is a touch pad device installed on the housing 26 for generating shifting signals, and two keys 30 for generating key signals. The cursor controller 28 can also be a roller ball device.

Please refer to FIG.2. FIG.2 is a side section view 2—2 of the cursor control device 12 shown in FIG.1. The cursor control device 12 comprises a housing 26, a recess 54 installed on it, a cursor controller 28 elastically installed in the recess 54 which can be slightly pressed down for generating a shifting signal, a switch 48 installed in the recess 54 beneath the cursor controller 28 for generating a start signal, a wire 50 for connecting the cursor controller 28 to the computer 24, and an elastic spring 46 installed in the recess 54 beneath the cursor controller 28. The cursor controller 28 comprises a circuit board 44 on its lower end. One end of the circuit board 44 is embedded in a groove 58 within the recess 54 and the other end is positioned above the spring 46. When the cursor controller 28 is pressed downward by using a finger, it will trigger the switch 48 to generate a start signal. When the cursor controller 28 is released, it will be pushed upwards by the spring 46, and the switch 48 will also be released and stop generating the start signal.

Please refer to FIG.3. FIG.3 is a function block diagram of the cursor control system 10 shown in FIG. 1. System 10 comprises a displaying device 14, a computer 24 electrically connected to the displaying device 14, and a cursor control device 12 electrically connected to the computer 24. The computer 24 comprises a memory 74 for storing programs, a display control program 76 stored in the memory 74 for controlling the display of the pop-up menu 20 and the movement of the cursor 18 according to shifting signals generated by the cursor control device, and a processor 70 for executing the display control program 76.

The cursor control device 12 comprises a cursor controller 28 for generating shifting signals, a switch 48 for generating start signals, a keypad circuit 66 which contains the two keys 30 shown in FIG.1 for generating key signals, and a control circuit 70 for transmitting all the signals to the computer 24 through an interface circuit 72.

When a user presses the cursor controller 28 downward to trigger the switch 48, the display control program 76 of the computer 24 will receive the start signals generated by the switch 48 through the interface circuit 72 and then display the menu 20 over the displaying device 14. The user can then use the cursor controller 28 to control movements of the cursor 18 over the displaying device 14 in order to select one command region 21 of the menu 20. When the user touches the cursor controller 28 which is a touch pad device, it will generate shifting signals accordingly and the display control program 76 will move the cursor 18 according to the shifting signals to select one command region 21 on the menu 20. When the user releases the cursor controller 28 and also the switch 48 under the cursor controller 28, the display control program 76 will begin to execute the computer command of the selected command region 21.

In the above mentioned pop-up menu control method, a user needs to press the cursor controller 28 continuously in order to select and execute one computer command in the menu 20. Another method can be used by the display control program 76 to achieve the same result without such continuous pressing. The user can presses down the switch 48 once to generate a start signal by using the cursor controller 28. After receiving the start signal, the display control program 76 will display the menu 20 over the displaying device 14. The user can then use the cursor controller 28 to select one command region 21 and then presses down the cursor controller 28 and also the switch 48 again to generate another start signal. After receiving the second start signal, the display control program 76 will start executing the computer command of the selected command region 21.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cursor control system for controlling operations of a pop-up menu, the menu comprising a plurality of command regions each correspondent to a computer command, the system comprising a displaying device for displaying the pop-up menu, a computer electrically connected to the displaying device and a cursor control device electrically connected to the computer, the computer comprising a program for controlling image display of the displaying device and operations of the menu, the cursor control device comprising:

(1) a housing having a recess installed on it;
    (2) a cursor controller installed in the recess for generating shifting signals, and
    (3) a switch installed in the recess beneath the cursor controller for generating start signals;

wherein when the cursor controller is being pressed to trigger the switch to generate the start signals, the program displays the menu over the displaying device after receiving the start signals, the program selects one command region of the menu according to the shifting signals later on generated by actuating the cursor controller, and the program executes the command correspondent to the selected command region when the switch under the cursor controller is released and stops generating the start signal.

2. The cursor control system of claim 1 wherein the cursor controller can be a touch pad device or a track ball device for generating the shifting signals.

3. The cursor control system of claim 1 wherein the cursor controller is elastically installed in the recess.

4. A cursor control system for controlling operations of a pop-up menu, the menu comprising a plurality of command regions each correspondent to a computer command, the system comprising a displaying device for displaying the pop-up menu, a computer electrically connected to the displaying device and a cursor control device electrically connected to the computer, the computer comprising a program for controlling image display of the displaying device and operations of the menu, the cursor control device comprising:

(1) a housing having a recess installed on it;
    (2) a cursor controller installed in the recess for generating shifting signals, and
    (3) a switch installed in the recess beneath the cursor controller for generating start signals;

wherein the program displays the menu over the displaying device after receiving a first start signal generated by the switch by pressing the cursor controller once, and the program selects one command region of the menu according to the shifting signals later on generated by actuating the cursor controller, and the program executes the command correspondent to the selected command region after the program receives a second start signal generated by the switch by pressing the cursor controller once again.

5. The cursor control system of claim 4 wherein the cursor controller can be a touch pad device or a track ball device for generating the shifting signals.

6. The cursor control system of claim 4 wherein the cursor controller is elastically installed in the recess.

* * * * *